United States Patent

Kiyosawa

[11] Patent Number: 6,029,768
[45] Date of Patent: Feb. 29, 2000

[54] POWER ASSIST DEVICE FOR STEERING APPARATUS

[75] Inventor: Yoshihide Kiyosawa, Nagano-ken, Japan

[73] Assignee: Harmonic Drive Systems, Inc., Tokyo, Japan

[21] Appl. No.: 09/172,275

[22] Filed: Oct. 14, 1998

[30] Foreign Application Priority Data

Oct. 16, 1997 [JP] Japan .................................. 9-282436

[51] Int. Cl.$^7$ ....................................................... B62D 5/04
[52] U.S. Cl. ............................................................. 180/444
[58] Field of Search .................................. 180/443, 444, 180/445, 446

[56] References Cited

U.S. PATENT DOCUMENTS 5,850,765  12/1998  Shirasawa ................................. 74/640
5,931,054  8/1999   Shirokoshi et al. ...................... 74/640

*Primary Examiner*—Kevin Hurley
*Attorney, Agent, or Firm*—Burns, Doane, Swecker & Mathis LLP

[57] ABSTRACT

In a power assist device 5, a hollow type electric motor 6 and a hollow-type wave drive gear 7 are concentrically arranged, and a steering shaft 2 is inserted into the center of these component parts. The rotational output of the hollow output shaft 61 of the electric motor 6 is input to a wave generator 74, and a rotational output of reduced speed is derived from a cup-shaped flexible external gear 73. This rotational output is transferred as a force assisting the steering shaft 2 in steering operation. The power assist device 5 employs a small, compact wave gear drive and has the motor 6 and the wave drive gear 7 each of hollow type adaptable to be concentrically mounted on the outer periphery of the steering shaft 2. Therefore a small, compact power assist device can be configured, substantially reducing the installation space.

7 Claims, 2 Drawing Sheets

POWER ASSIST DEVICE FOR STEERING APPARATUS

BACKGROUND OF THE INVENTION

1. Field of the Invention

The present invention relates to a power assist device for a steering apparatus which uses the rotational output of a motor for assisting the steering wheel with the steering force.

2. Prior Art Description

The steering mechanism of an automotive vehicle generally employs a pinion formed at the top end of a steering shaft with a steering wheel mounted thereon. When the steering wheel is operated, the rotation thereof is converted into a linear motion of a rack in mesh with the pinion along the transverse direction of the vehicle, whereby the left and right wheels are steered.

The power assist device for assisting the steering wheel in the steering operation includes an electric motor, a reduction mechanism for reducing the speed and outputting the rotational force of the motor, and a pinion rotated by the rotational output of reduced speed. This pinion is in mesh with the aforementioned rack for steering. A planetary gear mechanism is generally employed as the reduction mechanism.

Also, a distortion sensor is mounted on the steering shaft side of the pinion. The signal detected by the distortion sensor is supplied to a controller. The controller, on the other hand, controls the drive of the electric motor based on the detection signal, and thus can generate an optimum assisting force corresponding to the steering force.

SUMMARY OF THE INVENTION

It is an object of the present invention to propose a power assist device for a steering apparatus configured in a small, compact form as compared with the conventional one.

In order to solve the aforementioned problems, the present invention provides a power assist device for a steering apparatus, in which the drive of a motor is controlled in accordance with the steering force applied to the steering shaft from the steering wheel, and the rotational output of the motor is transmitted as a steering assisting force to the steering shaft through a reduction gear. A wave gear drive is employed as the reduction gear.

The wave gear drive has a small number of component parts with a small, compact configuration, and therefore, as compared with the planetary gear drive, can configure the compact power assist device.

According to a preferred embodiment of the invention, a wave gear drive is arranged concentrically with the steering shaft. Compared with the conventional art in which a reduction gear is arranged on the lateral side of the steering shaft, therefore, the power assist device can be configured to the compact form.

According to another preferred embodiment of the invention, the motor is a hollow-type motor having a through hole formed in the center and a hollow output shaft defining the through hole. The wave generator of the wave gear drive also has a through hole formed in the center thereof. The motor and the wave gear drive are concentrically arranged in a state where the hollow output shaft of the motor and the wave generator are adjacently located. In this way, the steering shaft is rotatively inserted into the respective through holes of the hollow output shaft of the motor and the wave generator so as to be connected to the flexible external gear.

With this configuration, the motor and the wave gear drive can be arranged concentrically on the outer periphery of the steering wheel. Therefore, a small, compact power assist device can be configured, thus reducing the installation space.

According to still another preferred embodiment of the invention, the steering shaft is inserted into the flexible external gear of the wave gear drive so as to be directly connected to the steering gear box. This configuration may maintain the steering operation of the steering wheel even if the power assist device fails to operate owing to a malfunction.

In the present invention, a cup-shaped flexible external gear can be employed for the wave gear drive.

The power assist device for a steering apparatus as a preferred embodiment of the invention includes detection means for detecting the steering condition of the steering shaft and means for controlling the power supplied to the motor based on the result of detection by the detection means, thus generating an appropriate assisting force for steering.

DETAILED DESCRIPTION OF THE PREFERRED EMBODIMENT

Figure 1:
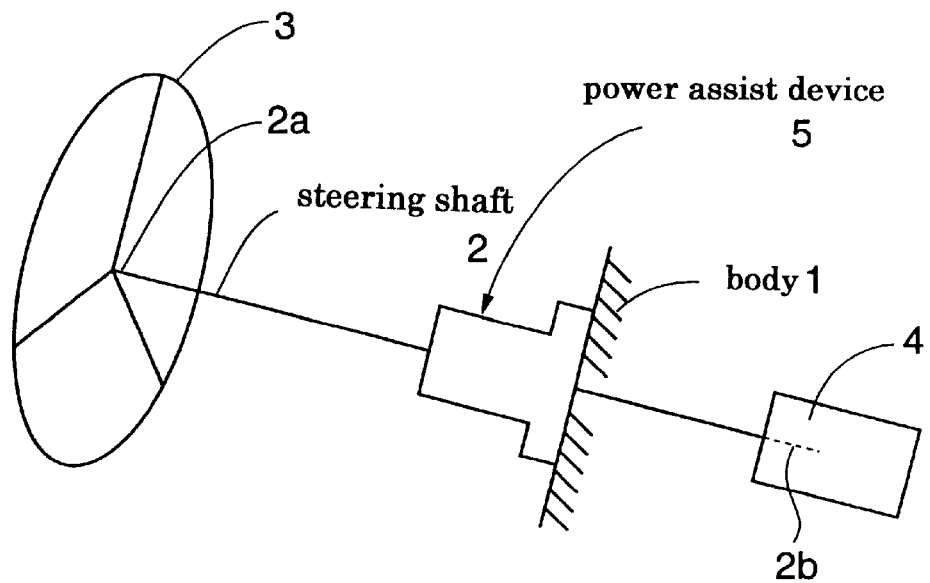
FIG. 1 is a diagram schematically illustrating a configuration of the essential parts of a steering mechanism to which the present invention has been applied.

Embodiments of the present invention will be hereinafter described referring to the drawings.

FIG. 1 illustrates the essential part of a power steering mechanism of a motor vehicle having a power assist device for a steering apparatus according to an embodiment of the invention.

A general configuration of the power steering mechanism is similar to that of an ordinary steering mechanism. A steering wheel 3 is mounted on the upper end 2a of a steering shaft 2 rotatively supported to a vehicle body 1. The lower end 2b of the steering shaft 2 is connected to a steering gear box 4. A rack (not shown) in mesh with a pinion formed at the lower end 2b of the steering shaft 2 is arranged in the gear box 4. As the rack moves in a transverse direction of the vehicle body, the left and right wheels are operated to turn. A power assist device 5 is mounted on the outer peripheral portion of the steering shaft 2.

Figure 2:
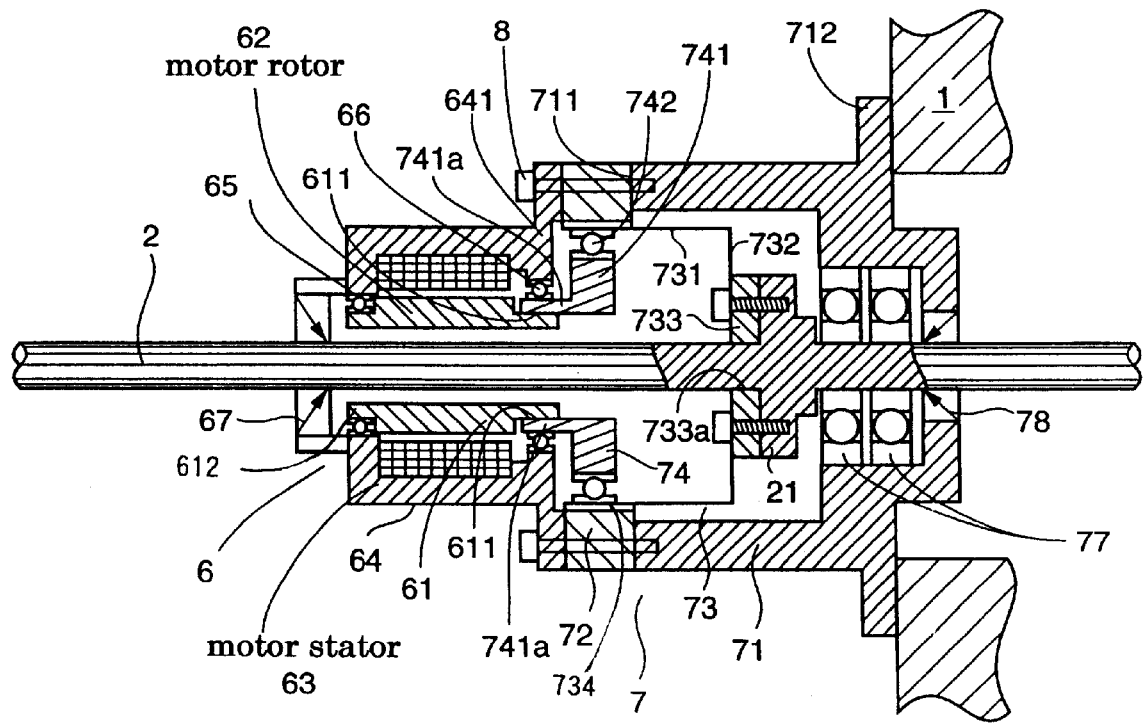
FIG. 2 is a longitudinal sectional view schematically illustrating the power assist device shown in FIG. 1.

FIG. 2 shows a sectional view of the configuration of the power assist device 5. The power assist device 5 includes a hollow-type electric motor 6 concentrically arranged along the outer periphery of the steering shaft 2 and a wave gear drive 7 of hollow cup type. The electric motor 6 is arranged on the side of the steering wheel 3.

The hollow-type electric motor 6 includes a hollow output shaft 61 extending through the center of the electric motor 6, a motor rotor 62 integrally formed with the outer peripheral portion of the hollow output shaft 61, and a motor stator 63 concentrically arranged with the motor rotor 62 so as to surround the outer periphery thereof. The motor stator 63 is mounted to be fixed on the inner peripheral surface of a cylindrical motor case 64.

The wave gear drive 7 includes a generally cylindrical apparatus casing 71, an annular rigid internal gear 72 mounted to be fixed onto the apparatus casing 71, a cup-shaped flexible external gear 73 concentrically arranged inside of the annular rigid internal gear 72, and a wave generator 74 concentrically arranged inside of the flexible external gear 73. The cup-shaped flexible external gear 73 is further formed of a cylindrical body 731, an annular diaphragm 732 that seals one end of the cylindrical body 731, a thick annular boss 733 integrally formed with the central portion of the diaphragm 732, and external teeth 734 formed on the outer peripheral surface of the opening at the other end of the cylindrical body 731. A through hole allowing insertion of the steering shaft 2 is formed in the center of the boss 733. The wave generator 74 further includes a rigid cam plate 741 generally having an elliptical outline, and a wave bearing 742 fitted on the outer periphery of the rigid cam plate 741. A through hole allowing insertion of the steering shaft 2 is likewise formed in the center of the rigid cam plate 741.

The electric motor 6 and the wave gear drive 7 are connected in the following manner. First, an annular flange 641 radially expanding outward is formed at the end of the motor case 64 of the electric motor 6. The annular rigid internal gear 72 is interposed between the annular flange 641 and the annular end surface 711 of the apparatus casing 71 of the wave gear drive. In the aforementioned arrangement, the above-identified three members are fastened with a set of fastening bolts 8. Meanwhile an annular flange 712 radially expanding outward is formed on the opposite end of the apparatus case 71 of the wave gear drive. The annular flange 712 is secured to the vehicle body 1.

One end portion 611 of the hollow output shaft 61 of the electric motor 6 is fitted and connected inside of an annular protrusion 741a protruding from the rigid cam plate 741 of the wave generator 74. The other end portion 612 of the hollow output shaft 61 is rotatively supported with respect to the inner peripheral surface of the end wall of the motor case 64 through a bearing 65. The outer peripheral portion of the annular protrusion 741a of the rigid cam plate 741 of the wave generator connected to the hollow output shaft 61 is likewise rotatively supported to the inner peripheral surface of the other end wall of the motor case 64 through a bearing 66.

The explanation will be hereinafter described with respect to connection between the steering shaft 2 and the wave gear drive 7. In the respective centers of the concentrically connected electric motor 6 and wave gear drive 7, a through hole for insertion of the steering shaft 2 is defined by each through hole of the hollow output shaft 61, the wave generator, and the boss 733 of the flexible external gear. The steering shaft 2 is fitted in the respective through holes.

An annular flange 21 radially protruding outward is formed at an intermediate position of the steering shaft 2. The annular flange 21 is fastened and fixed to the boss 733 of the flexible external gear. The steering shaft 2 is rotatively supported through bearings 77 mounted on the inner peripheral surface of the end wall of the apparatus casing 71 at a position adjacent to the fastened portion.

Oil seals 67, 78 are attached to the end of the motor case 64 of the electric motor from where the steering shaft 2 extends and to the end of the apparatus casing 71 of the wave gear drive, respectively.

Figure 3:
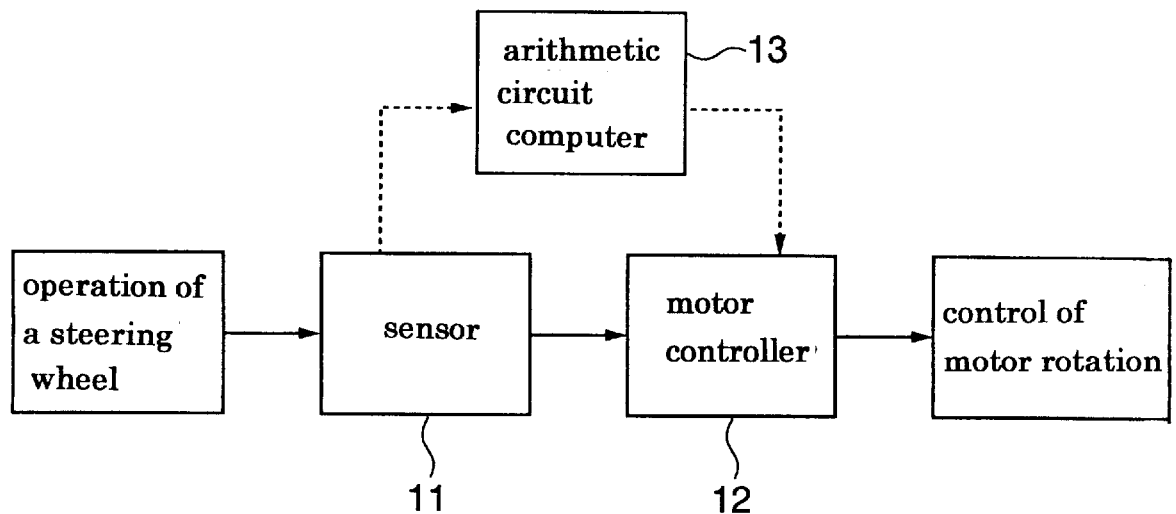
FIG. 3 is a block diagram schematically illustrating an outline of a control system for the power assist device shown in FIG. 2.

FIG. 3 illustrates a general arrangement of a control system of the above-configured power assist device. A sensor 11 for detecting the steering condition of the steering wheel 3 is mounted on the steering shaft 2. The steering condition is indicated by such parameters as the steering force exerted to the steering shaft 2, the torsion caused thereby, the torque generated thereby, the rotational angle and the angular acceleration of the steering shaft 2 and the like. Based on the steering condition obtained by detecting at least one of those parameters, the motor controller 12 controls the drive current for the motor 6 so as to secure an optimum assisting force as calculated by an arithmetic circuit 13.

In the above-configured power assist device of this embodiment, the rotational output of the electric motor 6 is input to the wave generator 74 of the wave gear drive 7. The flexible external gear 73 is elastically urged to an elliptical shape by the wave generator 74 such that the external teeth at both ends of the long axis of the flexible external gear 73 are brought into engagement with the internal teeth of the rigid internal gear 72. When the wave generator 74 rotates at a high speed, the positions where those two gears are engaged move in a circumference direction. The difference in the number of teeth between the two gears is $2n$ (n: positive integer) or, usually, 2. The flexible external gear 73 arranged on the output side may substantially decelerate the rotation in accordance with the difference in the number of teeth. As a result, the rotational output is transferred to the steering shaft 2 connected to the flexible external gear 73.

In the above-configured power assist device of this embodiment, the motor 6 and the wave gear drive 7 constituting a reduction gear are arranged on the outer periphery of the steering shaft 2. As a result, the power assist device can be configured to the compact arrangement and reduce the installation space.

Also, the steering shaft 2 extends through the electric motor 6 and the wave gear drive 7 to be directly connected to the gear box 4. In the case where a malfunction occurs in the power assist device, the assisting force cannot be obtained but the steering operation can be maintained, thus securing safety.

(Other Embodiments)

Figure 4:
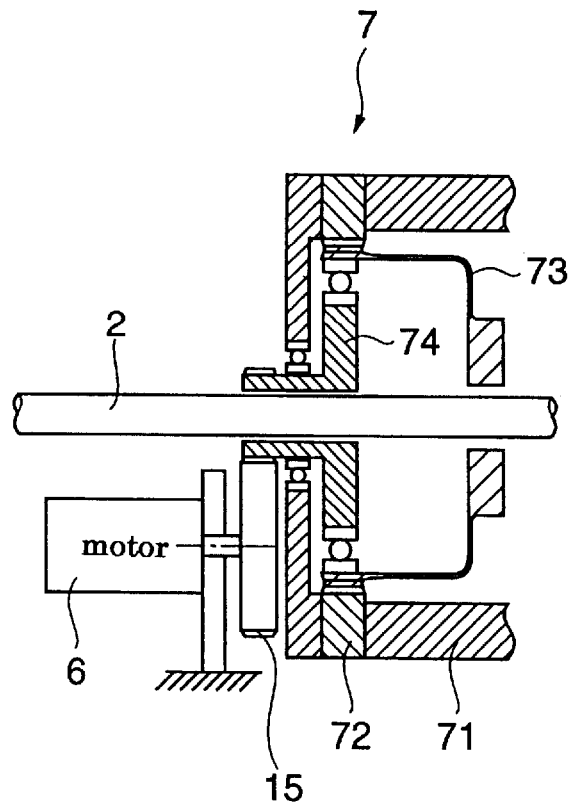
FIG. 4 is a sectional view partially illustrating a modified example of the power assist device shown in FIG. 2.

FIG. 4 shows a modified example of the power assist device shown in FIG. 2. In the example shown in FIG. 4, the electric motor 6 is not arranged concentrically with the steering shaft 2, but arranged on the lateral side. In this case, an ordinary motor rather than the hollow motor can be used as the electric motor 6. Also, the motor rotational output may be transferred through a gear train 15 to the wave generator 74 of the wave gear drive 7. The configuration of the other component parts is identical to that of the example shown in FIG. 2. The explanation of those component parts, thus, will be omitted.

In addition to the cup-shaped type, it is known that a silk hat type wave drive gear or a flat type wave drive gear that is provided with an annular flexible external gear and two annular rigid internal gears have been generally used. It is possible to use any of these drives.

In the present embodiment, the steering shaft 2 is formed of an integrated part as shown in the drawing. Alternatively, however, the steering shaft 2 can be separated into two parts, the shaft portion on the steering wheel side and the shaft portion on the gear box side, which can be concentrically joined through spline or the like.

As described above, the power assist device according to this invention employs a wave gear drive as a reduction gear for reducing the speed of the motor rotational output. The wave gear drive has a small number of component parts, resulting in the small, compact configuration. Compared with the device employing the planetary gear unit, the power assist device of the present invention can be configured to a small, compact form.

Also, according to this invention, the wave gear drive is arranged concentrically with the steering shaft. As a result, compared with the conventional configuration in which the reduction mechanism is arranged on the lateral side of the steering shaft, the size of the power assist device can be further reduced.

Further, according to this invention, a hollow-type motor and a hollow-type wave gear drive are employed and arranged concentrically with each other, through which the steering shaft is inserted. Therefore, all the component elements of the power assist device can be arranged on the outer periphery of the steering wheel. The power assist device can be configured to the small, compact form, thus substantially reducing the installation space.

Furthermore, according to this invention, the steering shaft is inserted through the flexible external gear of the wave gear drive and connected directly to the steering gear box. This configuration is allowed to maintain the steering operation even if the power assist device fails owing to the malfunction, thus securing safety.

What is claimed is:

1. A power assist device for a steering apparatus in which the drive of a motor is controlled in accordance with the steering force exerted to a steering shaft from a steering wheel, and the rotational output of said motor is transferred through a reduction gear to said steering shaft as a force assisting the steering operation, wherein:

said reduction gear is a wave gear drive including an annular rigid internal gear, an annular flexible external gear arranged inside of said annular rigid internal gear, and a wave generator fitted inside of said annular flexible external gear, said flexible external gear is radially urged by said wave generator so as to be partially in mesh with said rigid internal gear, the rotation of said wave generator moves the engaged portions of both of said gears along the circumferential direction to generate relative rotation corresponding to the difference in the number of teeth between said gears;

one of said rigid internal gear and said flexible external gear is connected to said steering shaft and the other gear is set on the fixed side; and said wave generator is connected to an output shaft of said motor.

2. A power assist device for a steering apparatus according to claim 1, wherein said wave gear drive is arranged concentrically with said steering shaft.

3. A power assist device for a steering apparatus according to claim 2, wherein:

said motor is a hollow-type motor including a through hole formed in a center thereof and a hollow output shaft defining said through hole;

said wave generator of said wave gear drive has a through hole formed in a center thereof;

said motor and said wave gear drive are concentrically arranged in a state where the hollow output shaft of said motor and said wave generator are adjacently arranged; and said steering shaft is inserted into the respective through holes of the hollow output shaft of said motor and said wave generator rotatively so as to be connected to said flexible external gear.

4. A power assist device for a steering apparatus according to claim 3, wherein:

said steering shaft includes a steering wheel side portion connected to said flexible external gear and a gear box side portion connected to the steering gear box, said steering wheel side portion and said gear box side portion are formed as an integral part or concentrically connected.

5. A power assist device for a steering apparatus according to claim 4, wherein:

said flexible external gear includes a cylindrical body, a diaphragm as an integral portion of said cylindrical body for sealing one end thereof, a boss integrally formed with a central portion of said diaphragm, and external teeth formed on an outer peripheral surface of the other open end of said body; and said steering shaft is inserted into the through hole formed in a center of said boss.

6. A power assist device for a steering apparatus according to any one of claims 1 to 5, further comprising:

detection means for detecting the steering condition of said steering shaft and means for controlling the power supplied to said motor based on the detection result from said detection means.

7. A power assist device for a steering apparatus according to claim 6, wherein said detection means detects the torsion or the torque acting on said steering shaft.

* * * * *